US007216807B2

(12) United States Patent
McClure

(10) Patent No.: US 7,216,807 B2
(45) Date of Patent: May 15, 2007

(54) AUTOMATED PROCESSING OF BY-MAIL BALLOTS

(75) Inventor: Neil L. McClure, Longmont, CO (US)

(73) Assignee: Hart InterCivic, Inc., Austin, TX (US)

( * ) Notice: Subject to any disclaimer, the term of this patent is extended or adjusted under 35 U.S.C. 154(b) by 0 days.

(21) Appl. No.: 10/461,586

(22) Filed: Jun. 12, 2003

(65) Prior Publication Data

US 2004/0041017 A1 Mar. 4, 2004

Related U.S. Application Data

(60) Provisional application No. 60/388,936, filed on Jun. 12, 2002.

(51) Int. Cl.
*G06K 17/00* (2006.01)

(52) U.S. Cl. ......................... 235/386; 235/375; 705/12

(58) Field of Classification Search ................ 235/386, 235/486, 462.01, 375, 376; 705/12
See application file for complete search history.

(56) References Cited

U.S. PATENT DOCUMENTS

| | | | | |
|---|---|---|---|---|
| 5,218,528 | A * | 6/1993 | Wise et al. | 705/12 |
| 5,377,099 | A * | 12/1994 | Miyagawa | 705/12 |
| 6,081,793 | A * | 6/2000 | Challener et al. | 705/50 |
| 6,817,515 | B2 * | 11/2004 | Winnett | 235/51 |
| 6,892,944 | B2 * | 5/2005 | Chung et al. | 235/386 |
| 2003/0173404 | A1 * | 9/2003 | Chung et al. | 235/386 |

* cited by examiner

*Primary Examiner*—Ahshik Kim
(74) *Attorney, Agent, or Firm*—Lathrop & Gage LC

(57) ABSTRACT

A ballot packaging system is automated to place ballots in envelopes. The ballots are printed by an assigned type according to voter information stored in a database. Each ballot includes a first printed indicia allocated to the ballot type, but this identifier does not particularly identify the voter. The first printed indicia is scanned to produce a scanned identifier signal. The ballot is placed in an envelope, which is printed with comparison indicia that enables a comparison to ascertain whether the ballot within the envelope does contain the intended ballot type.

27 Claims, 1 Drawing Sheet

AUTOMATED PROCESSING OF BY-MAIL BALLOTS

RELATED APPLICATIONS

This application claims benefit of priority to provisional application Ser. No. 60/388,936 filed Jun. 12, 2002.

BACKGROUND OF THE INVENTION

Governmental elections in the United States utilize a variety of subsystems to distribute ballots that individual voters use to record voted selections. For example, one type of subsystem uses paper ballots that are mailed to the voter who marks the ballot and then returns the ballot through the mail. Mailed ballots have been historically reserved for absentee voting and may be associated with additional documents, such as voting instructions or affidavits. For example, some jurisdictions may require absentee voters to sign an affidavit affirming the fact that they will be outside the boundaries of the election authority jurisdiction on election day. Over the last several years there has been a trend to relax the absentee requirement by allowing individuals who prefer to vote by mail to participate in an election through the mail without being absent from the jurisdiction. In fact, entire elections are being conducted exclusively "by-mail," including an Oregon state law that requires all elections to be conducted in this manner.

The growth of by-mail voting and elections has increased the volume of piece mail that must be produced and handled by a jurisdiction. Any one election can contain hundreds, even thousands, of different ballot styles to account for the individual eligibility of voters within a jurisdiction. The management of by-mail subsystems becomes further complicated when multiple language requirements are added. Furthermore, there is limited amount of time available to produce, deliver and process the return mail. There may be as few as thirty days between the time the ballots are approved for distribution and the time by which all returned ballot must be processed. As the number of by-mail ballots increase, the complexity and difficulty of producing a large number of mail pieces in a short amount of time reaches daunting levels. Established processing systems, such as manual systems, tend to break down under these increased loads. The breakdown of services may be exacerbated by the fact that elections are held only periodically, so that there may be a lack of continuity of staffing and experience between different elections.

The production and processing of by-mail ballots has historically been performed manually or has been contracted out to facilities that specialize in mail handling. Each voter is required to receive a specific ballot in relation to his or her demographic location, e.g., a residence within a voting precinct within which all ballots are alike. Elections can have in excess of one thousand different precincts. This circumstance results in the generation of thousands of different ballot styles, which must be manually packaged. By-mail balloting systems require a legion of people who bring along the human error associated with such an effort. Specialized mail handling facilities must also manage their processing by precinct or even at a sub-precinct level, and this is done by creating individual production runs. Each production run increases overhead and introduces additional probability for error.

Unique challenges exist in bringing a level of automation to the production of packaged ballots. In order to achieve a desired level of automation, management of packaging of the correct ballot style to targeted voter must break the sub-precinct layer. Current systems are unable to manage mail at the sub-precinct or ballot-specific level, as opposed to precinct level management in use according to current practices.

Electronic systems that permit direct entry of votes have improved to the point where voters may be provided with ballots that are custom made according to voter eligibility to vote in a selected list of elections within a precinct, for example, as described and shown in U.S. Pat. No. 6,250,548 to McClure et al., which is hereby incorporated by reference to the same extent as though fully disclosed herein. Improvements in early voting, for in-person voting processes, have been achieved through the use of direct recording electronic (DRE) systems that support multiple precincts simultaneously and allows ballot styles to be assigned to specific voters as required. Automated packaging of by mail ballots must possess the same type of capability in order to produce a significant improvement in existing processes, but the present systems in place for this purpose lack capability to perform the job with the requisite reliability and flexibility.

An examination of automated mail processing industry techniques reveals no available existing method that solves the unique challenges associated with packaging by-mail ballots that are managed at the ballot level for an election. While a voter must receive a specific ballot, election law prohibits the voter's name from appearing on the ballot. Therefore, if a voter is incorrectly mailed a ballot that is intended for another individual, there is some likelihood that the error may never be noticed. The closest functional mail processing capability is exemplified by bills or invoices produced for credit cards or utilities, and targeted advertising where the content is sent to a specific recipient. This capability relies on the ability to print the recipient's name directly on the mail piece which is then inserted in a windowed envelop displaying the correct name. Printing the name along with the content on the same sheet provides a 100% guarantee that the relationship is correct. It is generally infeasible to produce ballots that are mailed in this manner because by law the voter must remain anonymous in most instances. Specifically, the voter's name cannot be printed on the ballot that is returned to the election authority. Prohibiting the name and content from appearing on the ballot introduces a processing requirement that has not been previously solved.

SUMMARY

The present mail handling system overcomes the problems outlined above and advances the art by permitting the handling of by-mail ballots at the ballot level.

According to one aspect, software in a computerized electronic system calls upon a list of voters who are approved for mail-in voting purposes. By way of example, voters make a request to the governing jurisdiction for an absentee by-mail ballot and receive approval by processes that the governing jurisdiction establishes for these purposes. For all mail-in elections, all approved registered voters are slated to receive a by-mail ballot. In either instance of absentee voting or general by-mail voting, a list of voters is compiled that are to be sent ballots. Historically, this list was used to print mailing labels that were manually affixed to an envelope or, once sorted by precinct, used to print envelops in a batch mode for semi-automated processes.

The ballot printing approach of the present system differs from historical processes by driving the ballot printing from the list of approved voters so that there is a one-to-one correspondence between the ballots and approved voters. In essence, a print on demand system provides the most efficient process and eliminates waste. Such a system is manufactured by Hart InterCivic, Inc of Austin Tex., called Ballot Now™, and is a component of a complete electronic voting system. Ballot Now™ allows on-demand printing of ballots, e.g., through use of a conventional laser printer. Indicia on each ballot includes a machine-readable code, such as a bar code representing the precinct number on the ballot.

Any other method of ballot printing will suffice, provided the precinct number appears in some machine-readable code on the ballot. Traditional ballot printing methods, such as are used for optically scanned ballots, require offset printing processes due to registration requirements, but can also contain a machine-readable precinct number that is used for tabulation. Use of a system without on-demand capability requires ballots to be "pulled" to match the precincts of approved voters. Pulling the ballots introduces an unnecessary process step and creates a source of error.

The present mail handling system is capable of scanning the printed code on the ballot to produce a corresponding envelop that is addressed to the correct voter from a queue of voter addresses derived from the approved voter list. The envelope is also provided with a precinct code so that there is optionally permitted confirmation and verification that the proper ballot is being mailed to the correct voter at multiple process points while maintaining anonymity of the individual voter with respect to indicia on the printed ballot.

In one embodiment, the system for use in packaging ballots in envelopes contains data storage including voter-specific address information that is associated with a ballot type identifier. A ballot printing system, such a s a computer-controlled laser printer, is configured to access instances of the voter-specific address information and print a plurality of ballots. Individual ballots are selected as a ballot type associated with the voter-specific address information and printed to contain first indicia identifying the ballot type. A scanner, such as an optical or digital scanner, is configured to read the first indicia from the individual ballots to produce a scanned ballot identifier signal. Ballot insertion equipment is configured to place the ballot in a corresponding envelope. An envelope printing system is configured to print the envelope with the voter address information according to the ballot identifier signal, second indicia representative of the ballot identifier signal, and third indicia representing the ballot type identifier that is associated with the voter address information. An optical scanning system, which may include the aforementioned optical or digital scanner or a different scanner, is configured to compare the second indicia against the third indicia to assure that the ballot type is correct for the voter address information. Alternately, the third indicia may include or be replaced with a scanned image of the voter address information which is processed by commercially available Optical Character Recognition (OCR) software producing an intelligent record of the printed address that can be referentially compared through data processing means to the second indicia.

In other aspects, the scanning system may be supplemented with program instructions and mail handling equipment that direct the ballot packaged in the envelope to an outgoing mail location in instances where the second indicia and the third indicia do match. The program instructions and mail handling equipment may also redirect the ballot packaged in the envelope to other processing when the second indicia and the third indicia do not match. This other processing may, for example, entail halting ballot packaging processes until the problem is resolved.

The ballot type identifier may identify a precinct-level ballot or any other ballot of a particular type. The identifier may be coded and decoded, for example, as a barcode indicia. A mobile ballot box may be configured to store a plurality of ballot types in one of an electronic, magnetic or optical storage format.

The envelope printing system may operate by accessing a random access queue that disables the voter information for a particular voter from future access as the envelopes are printed with the voter information.

The methodology of operation may entail storing data that includes voter-specific address information associated with a ballot type identifier, and printing a plurality of ballots by ballot type associated with the voter address information where the plurality of ballots include individual ballots that bear first indicia identifying the ballot type. Scanning the first indicia produces a scanned ballot identifier signal. Thereafter, individual ballots are each into a corresponding envelope, which is printed with the voter address information, second indicia representative of the scanned identifier signal, and third indicia representing the ballot type identifier that is associated with the voter address information. Subsequent processing includes scanning the envelope to ascertain the second indicia and the third indicia, and comparing the second indicia with the third indicia to determine whether the ballot type is correct for the voter address information.

DETAILED DESCRIPTION

Figure 1:
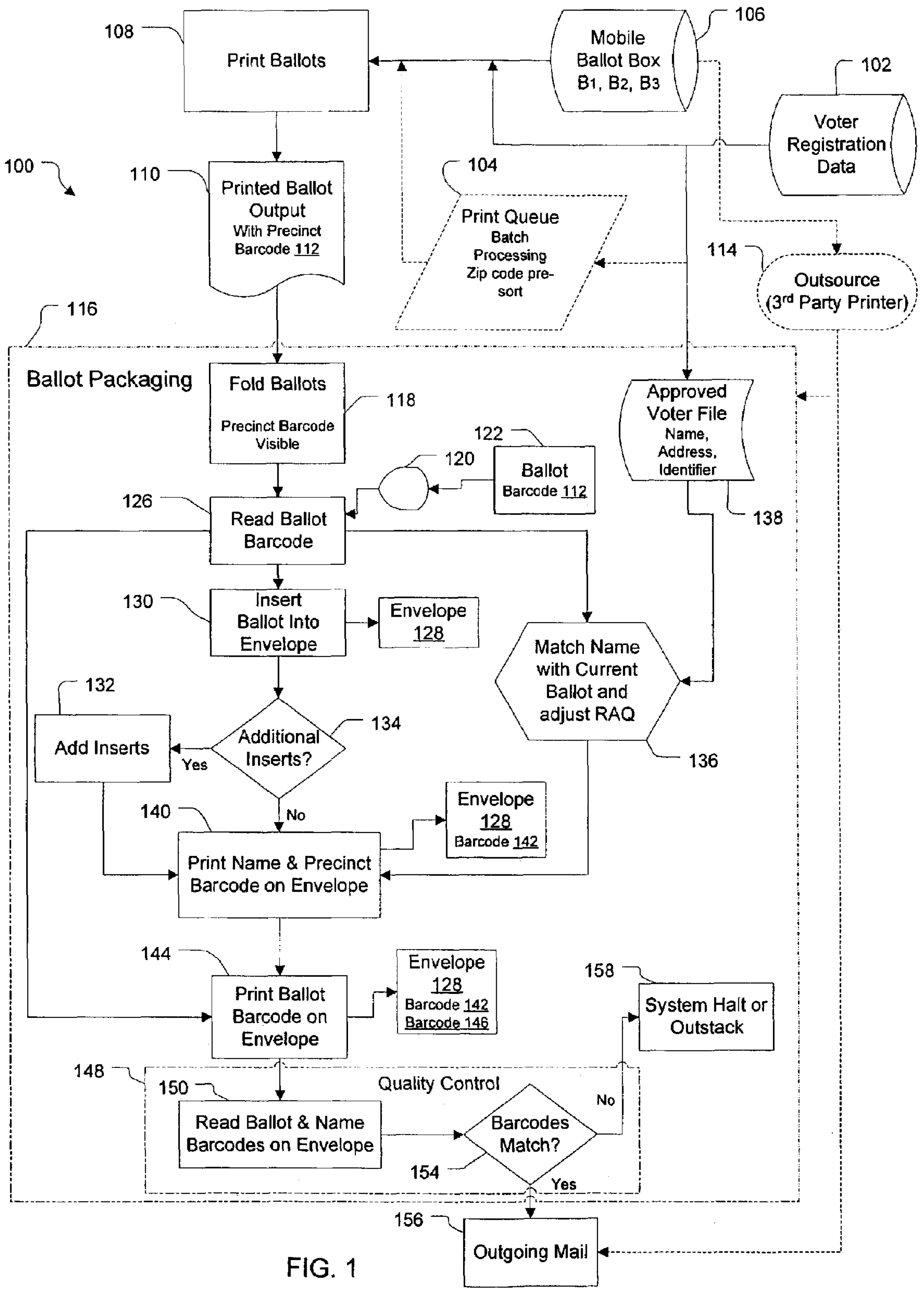
FIG. 1 is a process schematic diagram for methodology, equipment and materials embodied by the present system.

As shown by way of example in FIG. 1, a controller, processor or other programmable device may be programmed with instructions to implement a system 100 for automated printing of paper ballots. Voter registration data 102 originates from a conventional election headquarters or election governing authority. The voter registration data 102 contains a list of approved mail-in voters with associated mailing addresses and indicators of voter eligibility to vote in an election, such as precinct assignment data. For example, the voter address may be processed to ascertain eligibility to vote in state, county, municipal or elections of other subdivisions. The voter registration data is provided to a print queue 104.

A data module referred to herein as a mobile ballot box 106 provides a plurality of system-selectable ballot layouts in electronic form, e.g., forms $B_1$, $B_2$, and $B_3$. These layouts correspond to every possible layout that is called for in a subsequent print ballot step 108. For example, an electronic ballot form $B_1$ may be specifically constructed to contain all elections in which a particular voter or group of voters are eligible to vote. Alternatively a database or scanner capable of constructing these ballots may be used in place of the mobile ballot box 106. A mobile ballot box 106 is described, for example, in U.S. Pat. No. 6,250,548 to McClure et al.

The print ballot step 108 generates output including printed ballots 110. The printed ballots 108 may be generated in batch mode or individually, as needed. One software program useful in the print ballot step 108 is the Ballot Now™ product from Hart InterCivic of Austin, Tex. The print ballot step 108 generates printed ballots 110 on the basis of voter registration data from print queue 104. More generally, the print ballot step 108 produces a plurality of printed ballots 110 that are specially constructed for voter eligibility to vote in elections according to the voter registration data 102. The printed ballots 110 each contain a machine readable code 112 or identifier that identifies the ballot type. The machine readable code 112 or identifier may be, for example, a precinct number in barcode form where the ballots do not differ at the sub-precinct level, or a sub-precinct code that is unique to a ballot type within a precinct if the ballots differ at the sub-precinct level. By way of example, ballots may differ at the sub-precinct level for rotational purposes as required under California law. See, e.g., application Ser. No. 10/074,839 to McClure et al. describing equal time ballot rotational processes, which is hereby incorporated by reference to the same extent as though fully replicated herein. The voter registration data 102 forms the basis for ballot selection in print queue 104, e.g., by associating a ballot identifier as described above with the same identifier for an electronic ballot configuration stored in mobile ballot box 106.

Optionally, the processes and materials 102–112 may be outsourced in step 114 to a third party printer who implements the ballot packaging process 116.

The voter registration data 102 and the printed ballots 110 are the two primary inputs to the present ballot packaging process 116. It is significant to the discussion that follows that the voter list in print queue 104 and printed ballots 110 can be in any order, for example, so long as one of the printed ballots 110 can be or is associated with one voter in the voter registration data 102. Thus, printing mixups and inversions of order do not result in misdirected ballots once the envelopes are stuffed, printed and mailed according to the ballot packaging process 116 described below.

The following is a description of the overall ballot packaging process 116 that is operable to package a ballot for mail distribution using a high level of automation. The process steps can be re-ordered for convenience or other steps added, but the core functionality to produce an accurately packaged ballot in a manner that can be audited are represented.

The ballot packaging process 116 is provided as program instructions to hardware, for example, the commercially available automated mail processing equipment made by Pitney Bowes as the Model 8-Series folder/inserters or similar devices. The basic equipment is supplemented with program instructions and optical scanning equipment, as described below. Ballots are fed individually from the printed ballots 110 into the ballot packaging process 116. The printed ballots 110 are individually folded in step 118 in a manner that presents the bar code 112 or other machine readable identifier for optical scanning availability at scanner 120. For example, each individual ballot 122 is folded in such a manner that a machine readable barcode 112 is visible or readable. The barcode 112 is readily available for optical scanning such that optical scanner 120 reads the barcode 112 from the ballot 122 to produce a signal representative of the barcode 112, such as a digital or analog sequence identifying the barcode 112. This signal is positively checked to match to a code or other identifier that is allocated to one of the ballot types $B_1$, $B_2$, or $B_3$ stored in the mobile ballot box 106. By way of example, it is usually sufficient to match these codes at a precinct level where the precinct uses only one type of ballot. The barcode 124 is read in step 126 using the optical scanner 120.

The ballot packaging process 116 proceeds in parallel paths beginning at step 126. According to one path, the folded ballot 122 continues through the mail processing system for insertion into envelope 128 in step 130. Other materials and other inserts, e.g., a return envelope and voting instructions, are added as is optionally required in step 132 until the insertion process results in the correct number of inserts as determined by program instructions in step 134. Another path receives the barcode signal read in step 126, decodes the machine signal to identify a ballot type, and in step 136 uses the ballot type to access a list 138 of approved voters. The approved voter list 138 contains voter name, voter mailing address, and the identifier that produced a printed ballot for that voter by association with ballot type in the information stored in mobile ballot box 106.

Processing in step 136 identifies a registered voter by name and address where the registered voter is associated with an identifier that matches the ballot type of the ballot that was inserted into the envelope in step 130. The approved voter list 138 exists in a random access queue (RAQ) that, for example, initially contains an identical list of approved voters with respect to print queue 104 and may even be the same queue saved for subsequent operations. Access of the approved voter list 138 in step 136 returns the name and mailing address of an approved voter and his or her assigned ballot identifier code, which should match the barcode 112 on the ballot that was inserted into envelope 128 in step 130. The voter name and address information from step 136 is printed on the envelope 128 in step 140, as is the ballot identifier code 142 that is obtained from the approved voter list 138.

Once a voter name has been retrieved from the approved voter list 138 and printed on envelope 128 in step 140, the name and associated individual voter information is tagged or deleted from the approved voter list 138. This deletion or tagging prevents the name from being used again to print ballots or address envelopes for the current election. Tagging is preferred, as opposed to deletion, because tagging permits manual reactivation of the voter name in cases where a problem may arise in the ballot packaging process 116 such that a particular ballot 120 cannot be mailed. Further, the accumulated record of tagged voters can be fed back to the voter registration data 102 to create a history of ballots being packaged for the election, adding to auditability of the process.

One advantage of this processing is that positional equivalency is not required between the name retrieved from the approved voter list 138 and the position of a particular ballot 122 in the printed ballots 110. For example, one name from the approved voter list 138 can be in the $95^{th}$ position and a ballot 122 originate from the $3^{rd}$ ballot in a stack of printed ballots 110. All that is required is that the name retrieved in step 136 has a matching ballot code or identifier with the current ballot 122 that is inserted into an envelope during step 130. Under these requirements, the approved voter list 138 becomes a Random Access Queue (RAQ) and eliminates the need to logistically manage the tasks either of sequentially designating a specific ballot style to a particular voter or manually managing the order of the ballots inserted during step 130 to the order of the names on the approved voter list 138. By way of example, this feature is very useful in cases where ballot handling equipment causes a reordering of the printed ballots 110.

According to these processes, the only requirement is that the number of ballots in the printed ballots 110 for precinct X matches by ballot type the number of voters for precinct X by ballot type in the approved voter list 138. This fact greatly simplifies the ballot packing process by requiring that only the approved voter list 138 and printed ballots 110 correspond in number, not necessarily in sequence, and allows the printed ballots 110 to be packaged across all precincts, not one precinct at a time.

Step 144 entails printing a second machine readable code on envelope 122, such as a barcode 142. The barcode 142, by way of example, matches or is associated with the signal generated from barcode 112 that was read from ballot 122 in step 126 using optical scanner 120. Alternatively, the ballot 122 may be folded in such a way as to be visible from a transparent window in the envelope 128 (not shown), in which case it is not necessary to print the barcode on the envelope 128; however, it should here be noted that some election authorities are not permitted to package ballots in envelopes that have windows.

The ballot 122 within envelope 128 enters a mail processing quality control subsystem 148, which tracks the ballot 122 for quality control purposes through the remaining process steps.

At this point, envelope 128 visibly displays a first barcode 142 representing an intended machine readable code from the approved voter list 138 and a second barcode 146 representing a scanned machine readable code obtained by optical scanner 120 from barcode 124 on the folded ballot 122. The two machine-readable codes 142, 146 represent an intended code and an actual code that should match one another. The two machine-readable codes 142, 146 are scanned or read in step 150 using optical scanner 152. Step 154 entails a comparison to determine whether the machine readable codes 142, 146 do match. If so, the match assures that the envelope 128 contains a ballot type that is approved for use by a particular voter. Accordingly, the ballot 120 and envelope 128 may be placed in an outgoing mail stack 158. If the machine readable codes 142, 146 do not match, this indicates a systematic problem, such as the loss of an envelope between steps 140 and 142, and the ballot packaging process is halted 158 for manual resolution of the problem. Alternatively, the mismatched ballot 120 and envelope 128 may be submitted in step 158 to an outstack for manual resorting and recombination among a plurality of such mismatches.

Alternately, the third indicia may be replaced with a scanned image of the voter address information that is processed by commercially available Optical Character Recognition (OCR) software producing an intelligent record of the printed address that can be referentially compared through data processing means to the second indicia.

The quality control subprocess 148 prevents a voter from receiving the wrong ballot, which is a critical requirement of ballot packaging systems. It will be appreciated that the matching of machine readable codes 142, 146 does not necessarily have to occur at the precinct level. Matching may alternatively occur, for example, at a sub-precinct level for ballot rotation purposes, or a level higher than a precinct, depending upon whether different ballot types are required at these levels.

The quality control subprocess 148 also provides an audit trail testifying that a specific voter had a ballot packaged according to his or her eligibility. An audit trail is a requirement as given in the Federal Election Commission's Voting System Standards, 1990; however, no other systems, other than manual packaging systems, are capable of meeting this requirement.

Other process steps can be added including exception handling and error handling capabilities and integrate with the core of ballot packaging process 116. For example, the optical scanning processes involving bar codes may be replaced with magnetic scanning processes, e.g., using stickers with magnetic inserts. It is not necessary that machine readable codes 142, 146 must match to identity as printed on envelope 128. Matching may be accomplished indirectly, e.g., through a lookup table associating one code with another, if there is ever a reason to have two different codes printed on envelope 128. Additionally, it is not a system requirement that ballot 122 be folded prior to step 126, which entails reading the barcode 124 on ballot 122. The barcode 124 may be read in step 126 before or after the folding step 118.

Those skilled in the art will appreciate that the foregoing functionalities may be implemented as a combination of software and hardware. The teaching is by way of example to show a preferred embodiment, and should not be unduly construed to limit the scope of the claims. The inventor hereby states his intention to rely upon the Doctrine of Equivalents in protecting the fill scope of the invention.

I claim:

1. A system for use in packaging ballots in envelopes, comprising:

data storage including voter-specific address information associated with a ballot type identifier;

a ballot printing subsystem configured to access instances of the voter-specific address information to print a plurality of ballots where individual ballots are selected as a ballot type associated with the voter-specific address information and printed to contain first indicia identifying the ballot type;

a scanner configured to read the first indicia from the individual ballots to produce a scanned ballot identifier signal;

ballot insertion equipment configured to place the ballot in a corresponding envelope;

an envelope printing subsystem configured to print the envelope with the voter address information, second indicia representative of the scanned identifier signal, and third indicia representing the ballot type identifier that is associated with the voter address information; and a scanning subsystem configured to compare the second indicia against the third indicia to assure that the ballot type is correct for the voter address information.

2. The system of claim 1, wherein the scanning subsystem comprises means for directing the ballot packaged in the envelope to an outgoing mail location in instances where the second indicia and the third indicia do match, and for redirecting the ballot packaged in the envelope to means for other processing when the second indicia and the third indicia do not match.

3. The system of claim 2, wherein the means for other processing comprises program instructions for halting ballot packaging processes when the second indicia and the third indicia do not match.

4. The system of claim 1, wherein the ballot type identifier identifies a precinct-level ballot.

5. The system of claim 1, wherein the first indicia is a bar code.

6. The system of claim 1, wherein the ballot printing system comprises a mobile ballot box configured to store a plurality of ballot types in one of an electronic, magnetic or optical storage format.

7. The system of claim 1, where the envelope printing subsystem accesses a random access queue that disables the voter information for a particular voter from future access as the envelopes are printed.

8. The system of claim 1, wherein the ballot insertion equipment comprises means for folding the ballot prior to inserting the ballot into an envelope.

9. The system of claim 8, further comprising means for inserting materials in addition to the ballot into the envelope.

10. A method of ballot packaging comprising the steps of:

storing data that includes voter-specific address information associated with a ballot type identifier;

printing a plurality of ballots associated with the voter address information, the plurality of ballots including individual ballots that bear first indicia identifying the ballot;

scanning the first indicia to produce a scanned ballot identifier signal;

inserting individual ballots each into a corresponding envelope;

printing the envelopes with the voter address information, second indicia representative of the scanned identifier signal, and third indicia representing the ballot type identifier that is associated with the voter address information;

scanning the envelope to provide scanned information characterizing the second indicia and the third indicia to provide scanned information; and using the scanned information to compare the second indicia with the third indicia to determine whether the ballot type is correct for the voter address information.

11. The method of claim 10, further comprising a step of directing the ballot packaged in the envelope to an outgoing mail location in instances where the second indicia and the third indicia do match, as determined in the comparing step, and redirecting the ballot packaged in the envelope to other processes when the second indicia and the third indicia do not match.

12. The method of claim 11, wherein the redirecting step comprises halting ballot packaging processes.

13. The method of claim 10, wherein the step of printing a plurality of ballots includes accessing a mobile ballot box configured to store a plurality of ballot types in one of an electronic, magnetic or optical storage format.

14. The method of claim 10, where the step of printing the envelope includes accessing a random access queue and disabling from the random access queue the voter information for a particular voter from future access as the envelopes are printed.

15. A system for use in packaging ballots in envelopes, comprising:

data storage including voter-specific address information associated with a ballot type identifier;

a ballot printing subsystem configured to access instances of the voter-specific address information to print a plurality of ballots where individual ballots are selected as a ballot type associated with the voter-specific address information and printed to contain first indicia identifying the ballot type;

a scanner configured to read the first indicia from the individual ballots to produce a scanned ballot identifier signal;

ballot insertion equipment configured to place the ballot in an envelope;

an envelope printing subsystem configured to print the envelope with the voter address information as indicated by the ballot identifier signal, second indicia representative of the scanned identifier signal, and third indicia representing the ballot type identifier that is associated with the voter address information; and a means for reading the second indicia and the third indicia from the envelope and for comparing the second indicia against the third indicia to assure that the ballot type is correct for the voter address information.

16. The system of claim 15, further comprising program instructions for directing additional processing of the envelope on different physical paths according to the comparison outcome.

17. The system of claim 15, wherein the ballot type identifier identifies a precinct-level ballot.

18. The system of claim 15, wherein the first indicia is a bar code.

19. The system of claim 15, wherein the ballot printing system comprises a mobile ballot box configured to store a plurality of ballot types in one of an electronic, magnetic or optical storage format.

20. The system of claim 15, where the envelope printing subsystem accesses a random access queue that disables the voter information for a particular voter from future access as the envelopes are printed.

21. The system of claim 15, wherein the ballot insertion equipment comprises means for folding the ballot prior to inserting the ballot into an envelope.

22. The system of claim 21, further comprising means for inserting materials in addition to the ballot into the envelope.

23. A method of ballot packaging comprising the steps of:

storing data that includes voter-specific address information associated with a ballot type identifier;

printing a plurality of ballots associated with the voter address information, the plurality of ballots including individual ballots that bear first indicia identifying the ballot;

scanning the first indicia to produce a scanned ballot identifier signal;

inserting individual ballots each into a corresponding envelope;

printing the envelopes with the voter address information according to the ballot identifier signal, second indicia representing the ballot type identifier that is associated with the voter address information; and reading the second indicia and the third indicia from the enveloped and comparing the second indicia against the third indicia to assure that the ballot type is correct for the voter address information.

24. The method of claim 23, directing the ballot packaged in the envelope to an outgoing mail location in instances where the envelope contains the intended ballot type, and redirecting the ballot packaged in the envelope to other processes when the envelope does not contain the intended ballot type.

25. The method of claim 24, wherein the redirecting step comprises halting ballot packaging processes.

26. The method of claim 23, wherein the step of printing a plurality of ballots includes accessing a mobile ballot box configured to store a plurality of ballot types in one of an electronic, magnetic or optical storage format.

27. The method of claim 23, wherein the step of printing the envelope includes accessing a random access queue and disabling from the random access queue the voter information for a particular voter from future access as the envelopes are printed.

* * * * *